United States Patent
Winholtz

Patent Number: 5,736,926
Date of Patent: Apr. 7, 1998

[54] BRAKE LIGHT WARNING SYSTEM

[76] Inventor: William Stevenson Winholtz, P.O. Box 514, Blue Springs, Mo. 64014

[21] Appl. No.: 633,041

[22] Filed: Apr. 16, 1996

[51] Int. Cl.$^6$ ............................................. B60Q 1/44
[52] U.S. Cl. ............................ 340/479; 340/467; 362/61
[58] Field of Search ........................... 340/463, 464, 340/467, 468, 471, 475, 479; 362/61

[56] References Cited

U.S. PATENT DOCUMENTS

| | | | |
|---|---|---|---|
| 3,761,875 | 9/1973 | Camp | 340/464 |
| 4,800,377 | 1/1989 | Slade | 340/467 |
| 4,851,813 | 7/1989 | Gottlieb | 340/463 |
| 5,047,747 | 9/1991 | Gottlieb | 340/463 |
| 5,111,181 | 5/1992 | Priesemuth | 340/464 |
| 5,148,147 | 9/1992 | Kobres | 340/467 |
| 5,309,141 | 5/1994 | Mason et al. | 340/464 |

*Primary Examiner*—Jeffery Hofsass
*Assistant Examiner*—Daniel J. Wu

[57] ABSTRACT

The invention relates to an enhancement of a vehicle brake light system. Included in the invention are means for detection of variable deceleration rates and control circuitry for flashing an illumination device with different patterns according to the deceleration rate. The invention is similar in size to typical brake lights and is a self-contained unit.

7 Claims, 2 Drawing Sheets 1 and 2

BRAKE LIGHT WARNING SYSTEM

BACKGROUND OF THE INVENTION

This invention relates to a vehicle brake light warning system. In particular this invention relates to vehicle brake light systems and means for improving normal brake signaling by detecting the rate of deceleration and indicating this information through flashing of the brake illumination device.

Most vehicles are equipped with rearward facing visual signaling devices to indicate when the vehicles braking system is activated. However, typical brake light signaling does not indicate the degree of vehicle deceleration. It simply indicates that the braking system is activated. This may not be enough information for the operator of a trailing vehicle to safely maneuver to avoid a rear end collision. A higher level of safety can be achieved for one vehicle following another if the operator of the trailing vehicle is better alerted to the deceleration rate of the vehicle in front. This information can be provided by flashing the brake signaling device of the vehicle in front at different rates according to the deceleration rate. When presented with this information the operator of the trailing vehicle can react so as to brake at an appropriate rate.

The prior art has shown different methods to improve vehicle brake light systems by detecting the rate of deceleration and when the rate exceeds preset limits thereby causing the brake lights to flash. There are two reasons that restrict the commercial viability of these methods. First, many of them rely on some type of modification and interface to the vehicles existing brake system requiring the addition of switches, sensors, control circuitry, and cutting and splicing of the electrical circuits. This adds to the cost and complexity of new or retrofit installation. Second, many methods use mechanical inertia detectors to determine the rate of deceleration for input to the control circuitry. Many of these types of detectors are bulky, require mechanical alignment, and can be falsely triggered by the steep incline of a hill.

As an example, one method modifies the vehicle with an adjustable pendulum switch to detect deceleration and upon reaching a preset point activates a fixed rate flashing circuit interfaced to the existing emergency warning light circuit of the vehicle. In another example, the vehicle is modified with an adjustable mercury switch used to detect deceleration and upon reaching a preset point activates a fixed rate flashing circuit interfaced to the vehicles brake light circuit.

What is lacking is a device that requires no modification to the vehicle structure and electrical system, that uses a variable deceleration detector unaffected by vehicle incline, and that is easily applied in new or existing applications.

Although similar brake light warning methods have been described, none provide means for a brake light warning system that detects variable deceleration rate, flashes an illumination device with different patterns according to deceleration rate, and that is self-contained as described here. It is an object of the invention to provide an inexpensive warning system that is easy to install and is interchangeable with existing vehicle equipment.

SUMMARY OF THE INVENTION

This invention is an enhancement to a vehicle brake light system that senses vehicle deceleration rate and upon reaching preset limits flashes an illumination device at different rates signaling the driver following the vehicle to the rate of deceleration. A unique feature of this invention is a sense and control circuit containing all the necessary electrical functions for operation that is mounted in the fixture of the illumination device. This invention is completely self-contained and interchangeable with existing brake lights. It does not require any modification to the vehicle structure and electrical system. It is easily adaptable to a variety of current brake light configurations and can be used singularly, or in sets. Although the primary application for this invention may be motor vehicles such as cars, trucks, buses, motorcycles, it can be used on other non-motorized vehicles such as trailers of various types.

It is an object of this invention to use an accelerometer capable of determining variable rates of deceleration which is input to a control circuit that controls the illumination device thereby indicating multiple deceleration rates with multiple corresponding flashing patterns. A further object is the incorporation of the transducer and control circuitry of the invention into the fixture of typical brake lights making the invention a replacement for typical brake lights allowing direct substitution of the invention into new and existing vehicle applications of all types and configurations.

DESCRIPTION OF THE PREFERRED EMBODIMENTS

Figure 1:
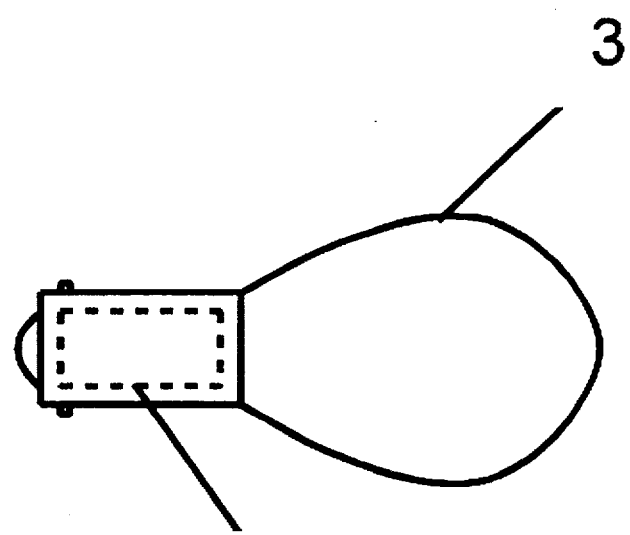
FIG. 1 is a plain view showing a typical embodiment of the brake light warning system.
Figure 2:
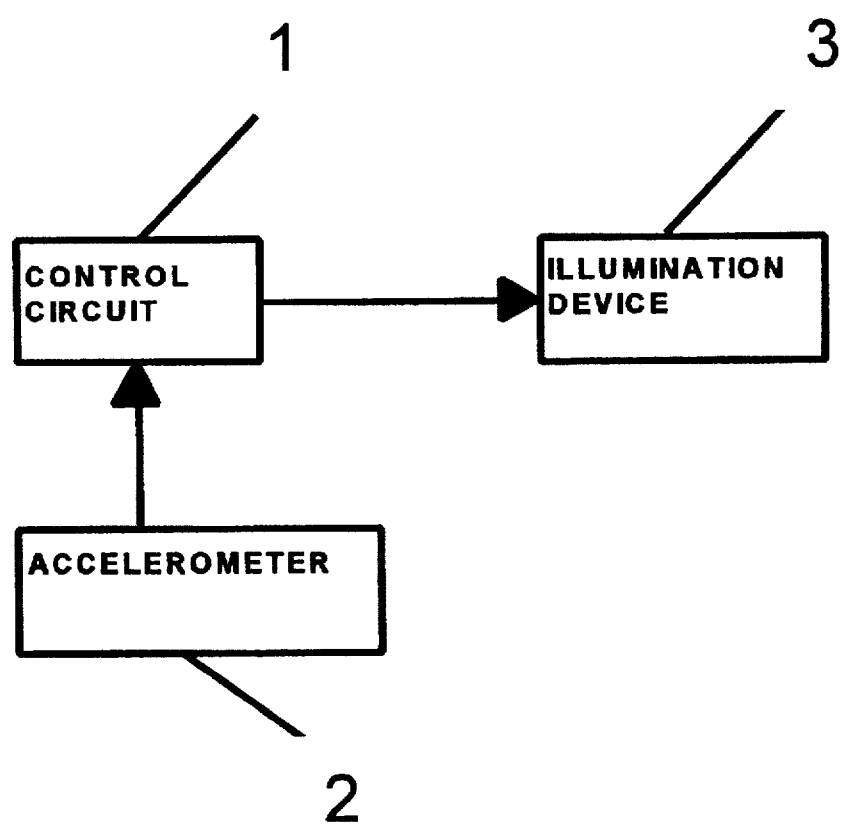
FIG. 2 is a block diagram of the sense, control circuitry, and illumination device.

Referring to FIGS. 1 and 2 a typical embodiment of the invention is shown in which the entire sense and control circuitry are mounted within the illumination device fixture. Voltage from the vehicle brake light system serves as power for the invention and as a logic indication that the brakes have been activated and is input to the control circuit 1. The accelerometer 2 detects the deceleration rate of the vehicle for input to the control circuit. The illumination device 3 illuminates when activated by the control circuit.

The function of the control circuit 1 is as follows. Upon activation of the vehicle brakes the control circuit 1 continually senses deceleration rate from the accelerometer 2. There are three deceleration rates of the vehicle that the control circuit responds to: normal deceleration corresponding to a typical gradual slowing, hard deceleration corresponding to a full application of the brakes to the point of wheel lock or just before wheel lock, moderate deceleration corresponding to deceleration midway between normal and hard deceleration. When the control circuit 1 determines that one of the above conditions is met then it controls the illumination device 3 as follows: normal deceleration turns on the illumination device 3 for 1 second then off for 0.5 second then on continuously as long as the brakes are activated, hard deceleration flashes the illumination device 3 on and off at a rate of 6 Hz for a duration of 8 seconds then on continuously as long as the brakes are activated, moderate deceleration flashes the illumination 3 device on and off at a rate of 3 Hz for a duration of 8 seconds then on continuously as long as the brakes are activated. The three conditions are ranked in the control circuit 1 from normal to hard deceleration, lowest to highest priority. At any time after the brakes are activated if the deceleration rate changes from a lower to a higher priority then the illumination device 3 is controlled with the new higher priority corresponding on off pattern.

Incorporated within the illumination device 3 fixture are the control circuit 1 and the accelerometer 2. The shape of the invention may take the form of various shapes and sizes typically used for brake lights in current and new designs. Provision is made in the invention to be compatible with multi-function brake light fixtures, such as brake light and parking light in one fixture. Control of the brake illumination device part is as previously described with the other functions in the fixture functioning normally.

An embodiment of the invention has been described. Various modifications within the spirit of the invention will occur to those skilled in the art and these modifications are intended to be within the scope of the following claims.

I claim:

1. A vehicle brake light warning system comprising: a housing with illumination device means on one end; and means on the other end of the housing to mechanically and electrically connect to a vehicle brake light receptacle where the vehicle brake light attaches, with no modification to the vehicle; and transducer means for determining deceleration rate which is input to a control circuit which flashes the illumination device means; and where the transducer means and control circuitry are mounted inside the housing.

2. The system of claim 1 wherein the transducer means for detection of deceleration rate provides variable output proportional to the deceleration rate.

3. The system of claim 1 wherein the control circuit provides different flash patterns of the illumination device means to indicate different deceleration rates of the vehicle.

4. The system of claim 1 wherein the flash patterns of the illumination device means are of multiple types upon activation; level one corresponding to a normal deceleration rate is sustained illumination with one off period of 0.5 second after an on time of 1 second, level two corresponding to a moderate deceleration rate is flashing at a rate of 3 Hz for a duration of 8 seconds, level three corresponding to a hard deceleration rate is flashing at a rate of 6 Hz for a duration of 8 seconds.

5. The system of claim 1 wherein the dimensions of the system are similar to typical brake lights allowing for interchange ability and direct replacement.

6. The system of claim 1 wherein the system maintains functionality with single or multiple circuits within typical brake lights.

7. The system of claim 1 wherein the illumination device means of the system produces minimum output luminance levels to typical brake lights.

* * * * *